April 16, 1929.  H. W. JACOBSON  1,709,020
SPLINE HOBBING PROCESS
Filed May 6, 1927    2 Sheets-Sheet 1

Inventor
Hugo W. Jacobson
By Attorneys
Nathan & Bowman

April 16, 1929.  H. W. JACOBSON  1,709,020
SPLINE HOBBING PROCESS
Filed May 6, 1927   2 Sheets-Sheet 2
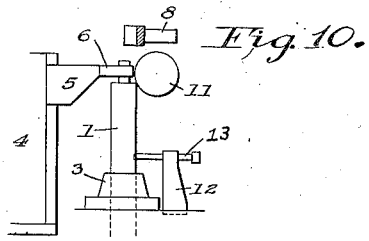
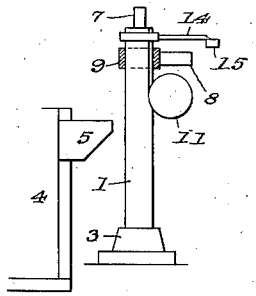
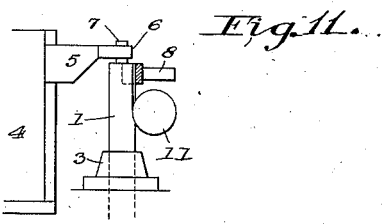
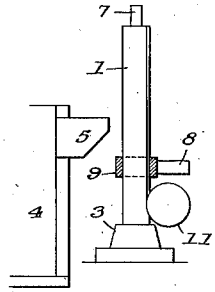
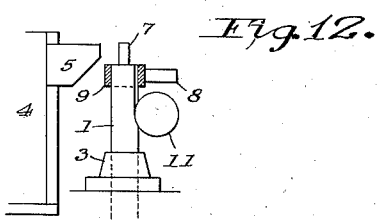
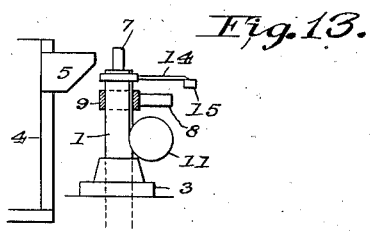
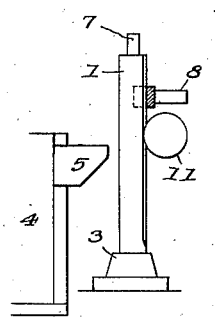
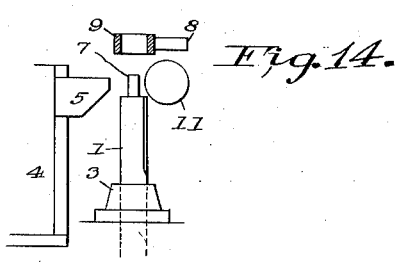
Inventor
Hugo W. Jacobson
By Attorneys
Nathan & Bowman Patented Apr. 16, 1929.

1,709,020

UNITED STATES PATENT OFFICE.

HUGO W. JACOBSON, OF ARLINGTON, NEW JERSEY, ASSIGNOR TO GOULD & EBERHARDT, OF NEWARK, NEW JERSEY, A CORPORATION OF NEW JERSEY.

SPLINE-HOBBING PROCESS.

Application filed May 6, 1927. Serial No. 189,354.

Multi-spline shafts, while of recognized desirability, have heretofore been made with difficulty as to accuracy and uniformity, especially when comparatively long, and the goal of this invention is to render available an essentially practicable method whereby a shaft may be splined with great precision for any predetermined length by a continual or cyclic hobbing operation.

Figure 1:
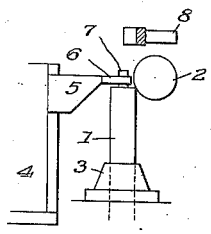
Figure 2:
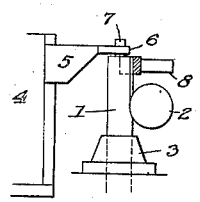
Figure 3:
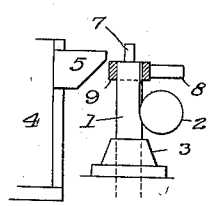
Figure 4:
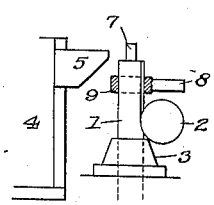
Figure 5:
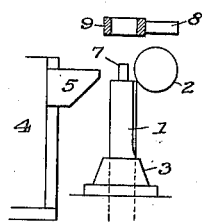
Figure 6:
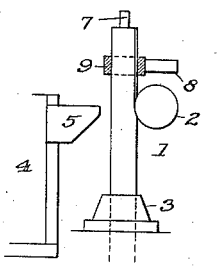
Figure 7:
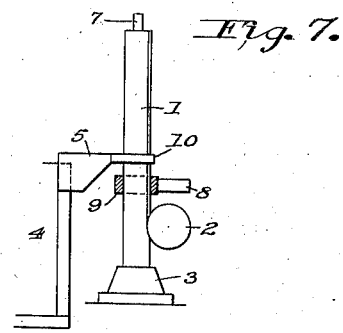

An understanding of the procedure will be facilitated by the accompanying diagrammatic illustrations of various steps composing a typical utilization of the method. In those drawings, Figs. 1 to 9 inclusive show successive relations during a "roughing" operation of the primary elements including a headstock, shaft blank, hob and follow rest and supporting means in which Fig. 1 shows the parts adjusted into position for the beginning of the roughing operation; Fig. 2 shows the operation advanced with the follow rest in engagement with the blank shaft; Fig. 3 is similar to Fig. 2 with the follow rest cap swung into position; Fig. 4 shows the hob advanced to a position where it is automatically stopped; Fig. 5 shows the hob returned to its initial position; Fig. 6 is the same but with the blank shaft longitudinally advanced to permit the hobbing of the next successive region; Fig. 7 illustrates the hob and follower advanced far enough for the application of a steady rest; in Fig. 8 the hob has again advanced to the end of its working stroke where it is automatically stopped; and in Fig. 9 the hob and associated parts have returned to the initial position preparatory to the replacement in the machine of a new shaft blank. Figs. 10 to 17 inclusive are quite similar to Figs. 1 to 9 inclusive in that they represent successive relations of the primary elements through a complete cycle of operation but which in this case is a finishing operation with corresponding modifications for the assurance of accuracy. In this series Fig. 10 shows the initial set up with the application of a setting gauge; Fig. 11 is similar to Fig. 2; Fig. 12 corresponds to Fig. 3; Fig. 13 illustrates the position where the translation is automatically stopped and with an indicating pointer applied preliminary to resetting the shaft and hob; in Fig. 14 the hob has been returned to its initial position; Fig. 15 depicts the step of lining up the shaft blank in an advanced position for finishing of the next section; Fig. 16 shows the hob as having completed its second working stroke; and in Fig. 17 the hob has been returned to the initial position for the substitution of a new work piece for further advancement of the shaft blank if its length is such as to require same.

It is desirable, when the greatest of precision is sought for, to act on the shaft when in a vertical position. This is the preferred embodiment and hence is resorted to in disclosing the principles constituting this method. One end or region of the blank shaft 1 is shown by Figs. 1, 2, 3, 4 and 5; this being the region in which the first section of the spline is to be generated. The hob is indicated by 2.

The blank-shaft and the hob will be simultaneously rotated at the relative rates determined by the conventional principles of hobbing, and to these elements will be imparted the necessary relative translations. These tooling manipulations may be performed through the agency of any suitable machine for holding, driving and feeding the hob and its work, respectively, and being well known to those skilled in the art need not be elaborated. It suffices to say that 3 is a hollow chuck, preferably of the tubular collet type arranged with its axis vertically. This hollow permits the major portion of the shaft, at the beginning of the process, to extend down through the base of the conventional machine and, if necessary, be received by a tubular pit sunk in the ground to an adequate depth. This, incidentally, conserves valuable floor space.

To start the operation, the hob 2 is brought to the upper station of its travel as indicated on Fig. 1. On the fixed standard 4 is clamped tail-stock 5 at an elevation such that a centering fixture or pilot 6, when affixed to the tail-stock 5, will occupy a position somewhat above and hence not interfering with the hob when it is about to start making its cut.

The shaft to be splined will usually be pre-formed with a reduced bearing end 7, and this will enter a snug fitting hole in the pilot fixture 6 to journal the end of the shaft and center it accurately in co-axial relation with the power-rotated chuck or collet 3. The hob-supporting stanchion (not shown) is now adjusted towards or away from the axis of the blank-shaft to correspond with the diameter of the spline shaft or to the depth to be given the spline-grooves. A preliminary cut is now taken for a distance sufficient to permit the follow rest 8 (with its half-cap swung aside) to travel past the plane of the centering-fixture and to occupy a station at the end region of the initially cut spline-grooves, as shown by Fig. 2.

The half-cap 9 may now be swung into place to make the follower completely circumscribe the shaft and prevent any distortion of it under the stresses of the rough-cutting operation. The period utilized for setting in place the half-cap 9 may, to advantage, be embraced for dis-placing the initial-used end-centering pilot 6. This serves no purpose in the subsequent cycles and should be gotten out of the way to permit the shaft to be intermittently raised during those cycles; as will shortly appear.

The half-cap 9 having been closed on the follower to embrace the shaft (as shown by Fig. 3) the first roughing stroke may then be completed; whereupon the hob will be carried to the station shown by Fig. 4. Throughout this advance, the follower 8 which is carried by the same head that carries the hob, always occupies a position immediately adjacent the hob.

The first section of the spline-grooves having been rough-cut, the first return-stroke of the hob with its follower ensues; these parts coming to a stop as shown by Fig. 5, to wit, at their initial station discussed in connection with Fig. 1. The follower is now spaced above the upper extremity of the shaft but in co-axial alignment therewith and ready to receive the shaft when, at the next step, it is shifted to bring its next section into the range of the hob.

The first shift of the shaft, as aforesaid, now is made. The rotations of the hob and chuck are suspended, the chuck is unclamped, and the freed shaft is elevated until the end of the pre-cut spline is brought into close proximity with the teeth of the hob. During this shift, the teeth of the hob are permitted to remain in the spline grooves and serve to maintain the original indexing relation with sufficient accuracy to satisfy the requirements of roughing-cuts. The chuck is now re-clamped (the parts being as shown by 6) and the machine is started to rotate the chuck and hob and to feed the latter until its follower, has travelled far enough to clear the space to be occupied by a shaft block 10; whereupon said block is attached to the tail-stock 5 to journal and steady the shaft. The tail-stock 5 may itself be shifted and clamped at the upper end of the slide of the standard 4. This will aid in eliminating any undesirable side-sway in the protruding length of the shaft.

Figure 8:
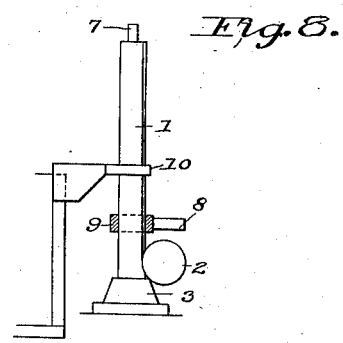
Figure 9:
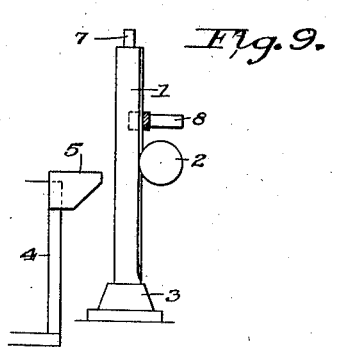

The completion of this roughing-stroke may now be accomplished, as indicated by Fig. 8, and the rotations stopped. The shaft-block is now removed as shown in Fig. 9; the hob and follower both returned, the half-cap released, the collet loosened, and the multi-splined shaft removed. This also prepares the hob and its follower for operation on the next shaft to be splined.

*Precision finishing.*

The method proposed for the finish-hobbing of multi-spline shafts, with the objective of attaining high accuracy, conforms to the general principles underlying the first-described roughing method; certain modifications by way of omission and addition being resorted to. Such modifications aim to take advantage of the lower working strains by avoiding the manipulation occasioned by the now needless shaft block, and meeting the great particularity of indexing by providing a way of gauging the successive settings easily yet with extreme precision.

The initial set-up is accomplished as diagrammed by Fig. 10 (see Sheet 2) in which a finishing hob 11 and a preliminary setting gauge 12 (with a thrust finger 13) are utilized; the other parts being the same as shown and described in connection with Fig. 1 of the roughing operation. The finger 13, being set into one of the roughed out grooves ensures that teeth of the finishing hob shall start their cutting in proper registry with the several pre-formed grooves.

The hob is now fed downwardly until the follower has cleared the initial centering fixture or pilot-block 6 which may now be removed. At this point, the half-cap 9 of the follower 8 is swung into place to journal the shaft and the hob is caused to perform its function to the end of its down stroke, and the machine is stopped.

Before disturbing the relationship between the hob and the finished spline-grooves, this relationship is accurately determined in a manner such that the shaft may be shifted longitudinally and re-clamped by its driver precisely in its correct relationship with the hob. A pointer 14 is clamped against a side wall of one of the finished grooves and its coincidence with an index block secured to the hob-carrier (as indicated by Fig. 13) is noted. This pointer is now removed so that the hob and follower may be returned to the beginning of its cutting stroke as indicated by Fig. 14; whereupon the shaft is unclamped and lifted until the hob is near the end of the initially cut portion of the spline groove. The pointer 14 as shown in Fig. 15 is now restored as before and the shaft turned sufficiently, if necessary, to bring the pointer exactly into its original registry with the aforesaid index block. The shaft is now again clamped by its driver, and the hob with its follower is caused to pursue its down-cutting stroke to finish the remainder of the spline-grooves as indicated by Fig. 16. The rotations are now stopped, and the hob and follower simply returned to their initial position, as shown by Fig. 17, so that the finished shaft may be removed and replaced by the next to be cut.

The several steps detailed in the foregoing are, as will now become apparent, intimately related towards the attainment of the highest degree of uniformity and precision in the multi-splined shafts generated by this method. Should circumstances not demand such extreme accuracy, certain of these steps may be omitted from the method, and in certain cases some of them may be modified or substituted.

Having thus revealed this invention, I claim as new and desire to secure the following combinations and elements, or equivalents thereof, by Letters Patent of United States:—

1. A cyclic method of accurately developing elongated multi-spline shafts which consists in first grasping the shaft near one end with a power-driven collet and journaling the shaft at a spaced distance therefrom to deter end-sway; then causing a rotating hob to spline the intermediate portion of said shaft; then returning the hob to its initial station, loosening said collet, shifting and indexing said shaft and re-tightening said collet; and again causing said rotating hob to feed to continue its formation of the spline.

2. The art of accurately making multi-spline shafts which consists in simultaneously rotating a hob and a shaft at mutually correlated rates, and translating the hob and a follower maintained adjacent thereto to preserve during the cutting operation the exact predetermined distance between the axes of the hob and the shaft and prevent any deflections of the shaft under the successive impacts of the teeth of the hob.

3. A cyclic method of accurately developing elongated multi-spline shafts which consists in first grasping the shaft in vertical position near one end with a power-driven collet; journaling the upper portion of shaft at a spaced distance from said collet; then causing a rotating hob to feed downwardly to spline the intermediate portion of said shaft; then raising the hob to its initial station, loosening said collet, upwardly shifting and indexing said shaft and re-tightening said collet; and again causing said rotating hob to feed downwardly to continue its formation of the spline.

4. The art of accurately making multi-spline shafts which consists in simultaneously rotating a hob and a shaft at mutually correlated rates, and translating the hob for a predetermined length of travel; simultaneously maintaining a follower adjacent the hob to preserve during the cutting operation the exact predetermined distance between the axes of the hob and the shaft and prevent any deflections of the shaft under the successive impacts of the teeth of the hob; then returning the hob and follower, re-setting the shaft, and repeating the operation to lengthen the spline grooves.

5. The art of accurately making multi-spline shafts which consists in supporting a shaft at one end by a pilot and at an intermediate portion by a collet; simultaneously rotating the hob and shaft at mutually correlated rates; translating the hob and a follower maintained adjacent the hob to preserve during the cutting operation the exact predetermined distance between the axes of the hob and the shaft and prevent any deflections of the shaft under the successive impacts of the teeth of the hob; shifting the shaft longitudinally to locate an uncut portion between the pilot and collet; and repeating the hobbing operation.

6. A cyclic method of accurately developing elongated multi-spline shafts which consists in first grasping an intermediate portion of the shaft with a power-driven collet and journaling the shaft at a spaced distance therefrom; then causing a rotating hob to spline the intermediate portion of said shaft; simultaneously feeding a follower to steady the shaft closely adjacent the hob; then returning the hob to its initial station, loosening said collet, shifting and accurately indexing said shaft and re-tightening said collet; again causing said rotating hob to feed to continue its formation of the spline; and repeating said cycles until the desired length of spline has been developed.

In witness whereof, I have hereunto subscribed my name.

HUGO W. JACOBSON.